US012050765B2

(12) United States Patent
Lee

(10) Patent No.: US 12,050,765 B2
(45) Date of Patent: Jul. 30, 2024

(54) METHOD FOR PROCESSING INTRAORAL IMAGE, AND DATA PROCESSING APPARATUS

(71) Applicant: MEDIT CORP., Seoul (KR)

(72) Inventor: Sung Hoon Lee, Seoul (KR)

(73) Assignee: MEDIT CORP., Seoul (KR)

( * ) Notice: Subject to any disclaimer, the term of this patent is extended or adjusted under 35 U.S.C. 154(b) by 0 days.

(21) Appl. No.: 17/961,339

(22) Filed: Oct. 6, 2022

(65) Prior Publication Data

US 2023/0111425 A1   Apr. 13, 2023

(30) Foreign Application Priority Data

Oct. 8, 2021   (KR) .................. 10-2021-0134466
Jul. 27, 2022  (KR) .................. 10-2022-0093458

(51) Int. Cl.
*G06F 3/048*   (2013.01)
*A61C 9/00*    (2006.01)
*G06F 3/04842* (2022.01)
*G06F 3/04845* (2022.01)

(52) U.S. Cl.
CPC ......... *G06F 3/04845* (2013.01); *A61C 9/004* (2013.01); *G06F 3/04842* (2013.01)

(58) Field of Classification Search
CPC .. G06F 3/04845; G06F 3/04842; A61C 9/004
See application file for complete search history.

(56) References Cited

U.S. PATENT DOCUMENTS

| 11,058,515 | B1* | 7/2021 | Raslambekov | .......... A61C 7/08 |
| 2011/0070562 | A1* | 3/2011 | O'Brien | ............... B33Y 70/00 |
| | | | | 700/98 |
| 2018/0081996 | A1* | 3/2018 | Fisker | ..................... B33Y 50/00 |
| 2018/0206949 | A1* | 7/2018 | Jordan | ............... A61C 13/0004 |
| 2023/0048898 | A1* | 2/2023 | Cofar | ..................... G16H 30/20 |
| 2023/0330939 | A1* | 10/2023 | Sugishita | ................ B22F 10/80 |

* cited by examiner

*Primary Examiner* — Mahelet Shiberou
(74) *Attorney, Agent, or Firm* — Sughrue Mion, PLLC

(57) ABSTRACT

Provided are a method and apparatus for processing an intraoral image. The data processing apparatus includes a memory including one or more instructions, and a processor configured to execute the one or more instructions stored in the memory, wherein the processor, by executing the one or more instructions, displays an eggshell generated based on surface data of a tooth selected from the intraoral image, provides a user interface that allows to adjust a boundary of the eggshell, and displays an eggshell transformed by adjusting the boundary of the eggshell according to a user input through the user interface.

10 Claims, 12 Drawing Sheets

METHOD FOR PROCESSING INTRAORAL IMAGE, AND DATA PROCESSING APPARATUS

CROSS-REFERENCE TO RELATED APPLICATIONS

This application is based on and claims priority under 35 U.S.C. § 119 to Korean Patent Application Nos. 10-2021-0134466, filed on Oct. 8, 2021, and 10-2022-0093458, filed on Jul. 27, 2022, in the Korean Intellectual Property Office, the disclosures of which are incorporated by reference herein in their entireties.

BACKGROUND

1. Field

The disclosure relates to a method for processing an intraoral image and a data processing apparatus. In particular, disclosed embodiments relate to a method and apparatus for processing an eggshell image for a selected tooth in an intraoral image.

2. Description of the Related Art

Dental Computer Aided Design/Computer Aided Manufacturing (CAD/CAM) technology is widely used for dental treatment, particularly, prosthetic treatment. The most important thing in dental treatment using CAD/CAM is to acquire precise three-dimensional data on the shape of an object, such as a patient's teeth, gums, and jawbone. When performing dental treatment, accurate calculation may be performed by a computer by using three-dimensional data obtained from an object. For example, to acquire three-dimensional data of an object in a dental CAD/CAM treatment process, methods such as computed tomography (CT), magnetic resonance imaging (MRI), and optical scanning may be used.

When the intraoral image processing apparatus acquires a three-dimensional intraoral image from the scan data, a user may select a target tooth to be a prosthesis object from among teeth of the three-dimensional intraoral image. In addition, the outer surface (hereinafter referred to as an eggshell) of the provisional crown may be generated using the surface data of the selected target tooth.

In general, since the eggshell of the temporary prosthesis is generated based on scan data prior to the treatment operation on the target tooth, the boundary of the eggshell of the temporary prosthesis does not match the actual margin line, so an operation to match the actual margin line is required.

SUMMARY

Provided are a method and apparatus for processing an intraoral image that enables simple adjustment of the boundary of the eggshell without distortion of the shape.

Additional aspects will be set forth in part in the description which follows and, in part, will be apparent from the description, or may be learned by practice of the presented embodiments of the disclosure.

According to an aspect of the disclosure, a data processing apparatus for processing an intraoral image includes a memory including one or more instructions, and a processor configured to execute the one or more instructions stored in the memory, wherein the processor, by executing the one or more instructions, displays an eggshell generated based on surface data of a tooth selected from the intraoral image. Additionally, the processor, by executing the one or more instructions, provides a user interface that allows to adjust a boundary of the eggshell. Additionally, the processor, by executing the one or more instructions, displays an eggshell transformed by adjusting the boundary of the eggshell according to a user input through the user interface.

According to an embodiment, the user interface includes an item that enables receiving a user input for selecting a size of the boundary of the eggshell.

According to an embodiment, the processor, by executing the one or more instructions, determines the size of the boundary of the eggshell based on a size selected according to the user input received through the user interface, and transforms the eggshell to have a determined boundary size.

According to an embodiment, the processor, by executing the one or more instructions, identifies a region from the boundary of the eggshell to a preset distance in an occlusion direction as a variable region, and identifies a region excluding the variable region from the eggshell as a fixed region; and connects the fixed region and the variable region transformed according to a change in the size of the boundary of the eggshell.

According to an embodiment, the processor, by executing the one or more instructions, provides a basic eggshell having a boundary of a basic size based on the surface data of the selected tooth, a largest eggshell having a boundary of the largest size expanded by a first size than the boundary of the basic size, and a smallest eggshell having a boundary of a second size reduced in size compared to the boundary of the basic size; and transforms the eggshell using at least two of the basic eggshell, the largest eggshell, and the smallest eggshell. The boundary of the eggshell varies between the boundary of the largest size and the boundary of the smallest size.

According to an embodiment, the user interface includes an item that transforms the basic eggshell into the largest eggshell according to a user input moving in a first direction, and transforms the basic eggshell into the smallest eggshell according to a user input moving in a second direction.

According to another aspect of the disclosure, an intraoral image processing method includes displaying an eggshell generated based on surface data of a tooth selected from an intraoral image;
providing a user interface that allows to adjust a boundary of the eggshell, and displaying a transformed eggshell by adjusting the boundary of the eggshell according to a user input through the user interface.

According to another aspect of the disclosure, provided is a computer-readable recording medium on which a program implemented to perform an intraoral image processing method by a computer is recorded, wherein the intraoral image processing method includes displaying an eggshell generated based on surface data of a tooth selected from an intraoral image, providing a user interface that allows to adjust a boundary of the eggshell, and displaying a transformed eggshell by adjusting the boundary of the eggshell according to a user input through the user interface.

BRIEF DESCRIPTION OF THE DRAWINGS

The above and other aspects, features, and advantages of certain embodiments of the disclosure will be more apparent from the following description taken in conjunction with the accompanying drawings, in which.

The inventive concept may be easily understood by the following detailed description and combination of the accompanying drawings, in which reference numerals refer to structural elements.

DETAILED DESCRIPTION

Figure 1:
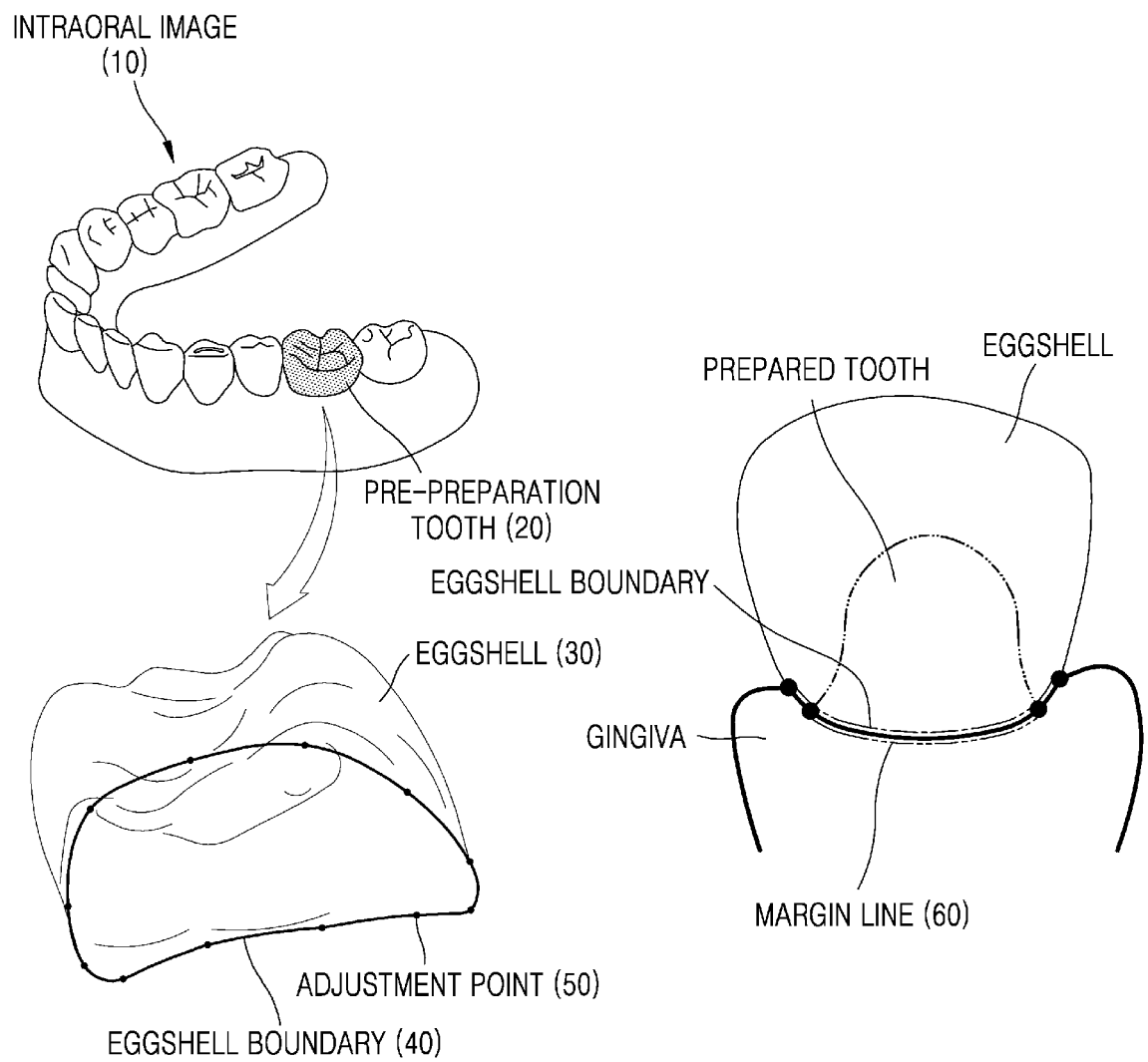
FIG. 1 is a reference diagram for explaining an eggshell according to embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

This specification clarifies the scope of the inventive concept, explains the principles of the inventive concept, and discloses embodiments so that those of ordinary skill in the art to which the inventive concept pertains may practice the inventive concept. The disclosed embodiments may be implemented in various forms.

Like reference numerals refer to like elements throughout the specification. This specification does not describe all elements of the embodiments, and general content in the technical field to which the inventive concept pertains is omitted. As used herein, the term "part" or "portion" may be implemented in software or hardware, and according to embodiments, a plurality of "units" may be implemented as one unit or element, or one "unit" may include a plurality of elements. Hereinafter, the working principle and embodiments of the inventive concept will be described with reference to the accompanying drawings.

In the present specification, the image may include at least one tooth or an image representing an intraoral cavity including at least one tooth (hereinafter, "intraoral image").

Also, in the present specification, an image may be a two-dimensional image of an object or a three-dimensional model or three-dimensional image representing the object three-dimensionally. Also, in the present specification, an image may refer to data necessary to represent an object in two or three dimensions, for example, raw data obtained from at least one image sensor. In particular, raw data is data obtained to generate an intraoral image and may be data (e.g., two-dimensional data) obtained from at least one image sensor included in an intraoral scanner when scanning the intraoral cavity of a patient, which is an object, using the intraoral scanner.

In the present specification, an "object" may include teeth, gingiva, at least a partial region of the intraoral cavity, and/or artificial structures (e.g., orthodontic appliances, implants, artificial teeth, orthodontic aids inserted into the mouth, etc.) that may be inserted into the intraoral cavity.

Tooth preparation refers to the process of generating space for planned restoration materials to restore the tooth to be restored to its original shape and function by cutting the tooth by removing the corrosion of the tooth or removing the structurally unstable part and may also be called "prep" for short.

Teeth before tooth preparation may be referred to as pre-preparation teeth.

A tooth after tooth preparation operation may be referred to as a prepared tooth.

A crown refers to a dental cap, which is a type of dental restoration that completely covers or surrounds a tooth or an implant. In contrast to a permanent crown, a crown used to protect the prepared teeth and prevent tooth movement until the final restoration is inserted may be called a temporary crown.

Hereinafter, embodiments will be described in detail with reference to the drawings.

FIG. 1 is a reference diagram for explaining an eggshell according to embodiments.

Before tooth preparation using Computer Aided Design/Computer Aided Manufacturing (CAD/CAM), a temporary crown (hereinafter, EggShell) may be designed based on the tooth model (e.g., pre-preparation data). That is, the target tooth to be the target of the eggshell may be selected from the intraoral image 10, the external surface of the eggshell may be generated using the tooth surface data of the selected target tooth, and the boundary of the eggshell may be generated based on the tooth gingiva boundary from the re-preparation intraoral image data. As described above, since the eggshell 30 is generated based on the tooth data (i.e., pre-preparation data) 20 before preparing the tooth, the boundary 40 of the eggshell generally does not coincide with the margin line 60. The margin line refers to the boundary point in contact with the target tooth when a restoration such as a crown or temporary crown is restored to the prepared target tooth and the boundary of the eggshell based on the pre-preparation data does not match the margin line.

Therefore, since the milling process or 3D printed eggshell is not accurately aligned to the preparation tooth when it is restored, the user (technologist) may work to match the margin line by trimming the boundary part of the eggshell.

In this way, when designing an eggshell, it is possible to set the boundary more freely than the margin line in general so that the boundary of the eggshell may be adjusted later. However, since the conventional boundary editing is performed by a manual method such as dragging the adjustment point 50 with a mouse as shown in FIG. 1, all adjustment points constituting the boundary must be corrected one by one. This may increase the working time along with the accumulation of fatigue of the user. In addition, in the case of manually adjusting the adjustment points constituting the boundary in this way, the shape of the loop, that is, the shape of the boundary between the tooth and the gingiva, may be easily transformed during boundary editing.

To solve this, the embodiments disclosed in the present disclosure provide a method that may conveniently adjust the eggshell boundary and avoid adjusting the shape of the boundary by being distorted.

Figure 2:
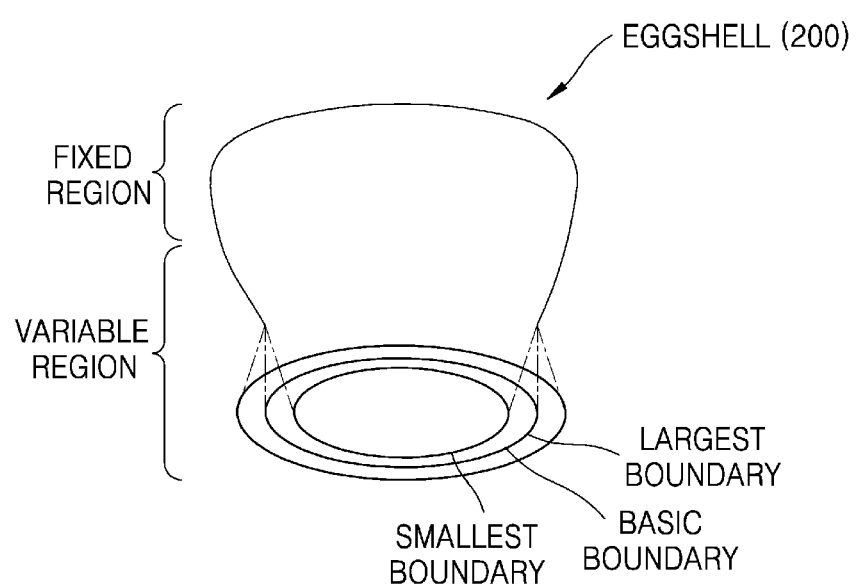
FIG. 2 is a reference diagram for explaining a method of enabling the boundary adjustment of the eggshell according to an embodiment.

FIG. 2 is a reference diagram for explaining a method of enabling the boundary adjustment of the eggshell according to an embodiment.

Referring to FIG. 2, a largest boundary and a smallest boundary may be provided based on the boundary of the eggshell 200 (hereinafter, the basic boundary) using the eggshell 200 generated based on the surface data of pre-preparation teeth according to an embodiment. The largest boundary may indicate a boundary extended by a preset distance from the basic boundary, and the smallest boundary may indicate a boundary reduced by a preset distance from the basic boundary. In this way, if the largest boundary and the smallest boundary are prepared in advance and the adjustment of the boundary is made between the largest boundary and the smallest boundary, the size may be conveniently adjusted without distorting the shape of the boundary.

Also, the eggshell 200 may be identified as a fixed region in which the shape of the eggshell does not change in the occlusion direction and a variable region in which the shape of the eggshell may be changed. In the variable region of the eggshell, the shape of the eggshell may be changed in response to the adjustment of the boundary. By connecting such a variable region and a fixed region, an eggshell with an adjusted boundary may be obtained. Also, when connecting the variable region and the fixed region, a part of the fixed region may be transformed.

Hereinafter, a method and apparatus for enabling the boundary adjustment of the eggshell will be described in detail.

Figure 3:
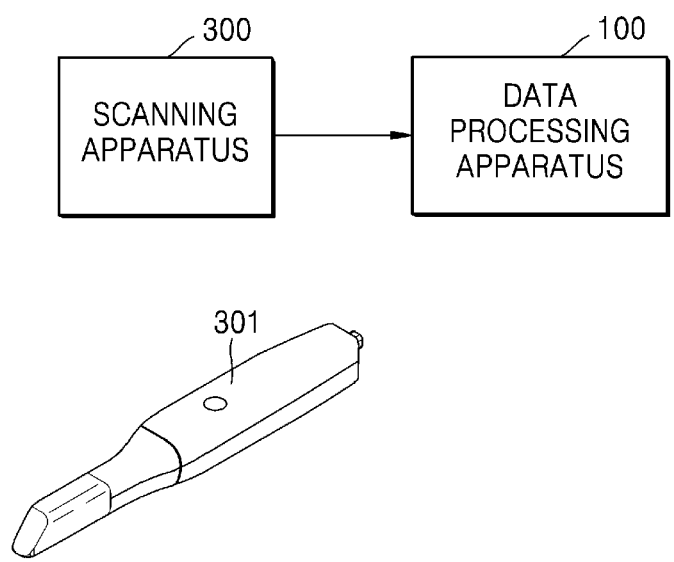
FIG. 3 is a view for explaining an intraoral image processing system according to the disclosed embodiment.

FIG. 3 is a view for explaining an intraoral model processing system according to the disclosed embodiment.

Referring to FIG. 3, the intraoral model processing system may include a scanning apparatus 300 and a data processing apparatus 100.

The scan apparatus 300 scans an object, and the object may include any object or body to be scanned. For example, the object may include at least a part of a patient's body including an intraoral cavity or face, or a model of teeth. The scan apparatus may include a handheld scanner for scanning an object while a user holds the handheld scanner, or a model scanner for installing a tooth model and scanning while moving around the installed tooth model.

For example, the intraoral scanner 301, which is a type of handheld scanner, may be a device for acquiring an image of an intraoral cavity including at least one tooth by being inserted into the intraoral cavity and scanning teeth in a non-contact manner. In addition, the intraoral scanner 301 may have a form that may be drawn in and out of the intraoral cavity, and scans the inside of the patient's intraoral cavity using at least one image sensor (e.g., an optical camera, etc.). The intraoral scanner 301 may acquire surface information on the object as raw data to image the surface of at least one of teeth, gingiva, and artificial structures (e.g., orthodontic devices including brackets and wires, implants, artificial teeth, orthodontic aids inserted into the intraoral cavity, etc.) insertable into the intraoral cavity, which are objects. The intraoral scanner 301 is suitable for scanning the intraoral cavity as it is in a form that is easy to enter and withdraw into the intraoral cavity, but of course, also scan body parts, such as a patient's face, using the intraoral scanner 301.

The scan apparatus 300 may acquire image data using an optical triangulation method, a confocal method, or other methods.

The image data acquired by the scan apparatus 300 may be transmitted to the data processing apparatus 100 connected through a wired or wireless communication network.

The data processing apparatus 100 may be any electronic device capable of being connected to the scan apparatus 300 through a wired or wireless communication network, receiving a two-dimensional image obtained by scanning an intraoral cavity from the scan apparatus 300, and generating, processing, displaying, and/or transmitting an intraoral image based on the received two-dimensional image.

The data processing apparatus 100 may generate at least one of information generated by processing two-dimensional image data and an intraoral image generated by processing two-dimensional image data based on the two-dimensional image data received from the scan apparatus 300, and display the generated information and the intraoral image through a display.

The data processing apparatus 100 may be a computing device such as a smart phone, a laptop computer, a desktop computer, a PDA, or a tablet PC, but is not limited thereto.

Also, the data processing apparatus 100 may exist in the form of a server (or server apparatus) for processing an intraoral image.

Also, the scan apparatus 300 may transmit raw data obtained through scanning to the data processing apparatus 100 as it is. In this case, the data processing apparatus 100 may generate a three-dimensional intraoral image representing the intraoral cavity three-dimensionally based on the received raw data. In addition, the "three-dimensional intraoral image" may be generated by modeling the internal structure of the intraoral cavity based on the received raw data in three dimensions, and may be referred to as a "three-dimensional intraoral model", a "digital intraoral model", or a "three-dimensional intraoral image". Hereinafter, a model or image representing the intraoral cavity in two or three dimensions is collectively referred to as an "intraoral image".

Also, the data processing apparatus 100 may analyze, process, display, and/or transmit the generated intraoral image to an external device.

As another example, the scan apparatus 300 may acquire raw data through a scan, process the obtained raw data to generate an image corresponding to the intraoral cavity, which is an object, and transmit the image to the data processing apparatus 100. In this case, the data processing apparatus 100 may analyze, process, display, and/or transmit the received image.

In the disclosed embodiment, the data processing apparatus 100 is an electronic device capable of generating and displaying an intraoral image representing an intraoral cavity including one or more teeth in three dimensions, which will be described in detail below.

According to an embodiment, when the data processing apparatus 100 receives raw data of an intraoral cavity scan from the scan apparatus 300, the data processing apparatus 100 may process the received raw data to generate an intraoral image representing a three-dimensional intraoral model. The raw data received from the scan apparatus 300 may include raw data indicating teeth and raw data indicating gingiva. Accordingly, the intraoral image generated by the data processing apparatus 100 may include a tooth region representing a tooth and a gingiva region representing a gingiva.

According to an embodiment, the data processing apparatus 100 may display an eggshell generated based on surface data of a tooth selected from an intraoral image. Also, the data processing apparatus 100 may provide a user interface for adjusting the boundary of the eggshell. Also, the data processing apparatus 100 may display a transformed eggshell by adjusting a boundary of the eggshell according to a user input through the user interface.

According to an embodiment, the user interface may include an item that enables receiving a user input for selecting a size of a boundary of the eggshell.

According to an embodiment, the data processing apparatus 100 may determine a size of a boundary of the eggshell based on a size selected according to a user input received through a user interface, and may transform the eggshell to have the determined boundary size.

According to an embodiment, the data processing apparatus 100 may identify a region from the boundary of the eggshell to a preset distance in the occlusion direction as a variable region, and identifies a region excluding the variable region in the eggshell as a fixed region, and connect the fixed region and the variable region modified according to the change in the size of the boundary of the eggshell.

According to an embodiment, the data processing apparatus 100 may prepare a basic eggshell having a boundary of a basic size based on the surface data of the selected tooth, a largest eggshell having a boundary of a largest size extended by a first size than the boundary of the basic size, and a smallest eggshell having a boundary of a smallest size reduced by a second size compared to the boundary of the basic size, and transform the eggshell using the basic eggshell, the largest eggshell, and the smallest eggshell. The boundary of the eggshell may vary between the boundary of the largest size and the boundary of the smallest size.

According to an embodiment, the user interface may include an item that transforms the eggshell into the largest eggshell according to a user input moving in the first direction and transforms the eggshell into the smallest eggshell according to a user input for moving in the second direction based on the basic eggshell.

Figure 4:
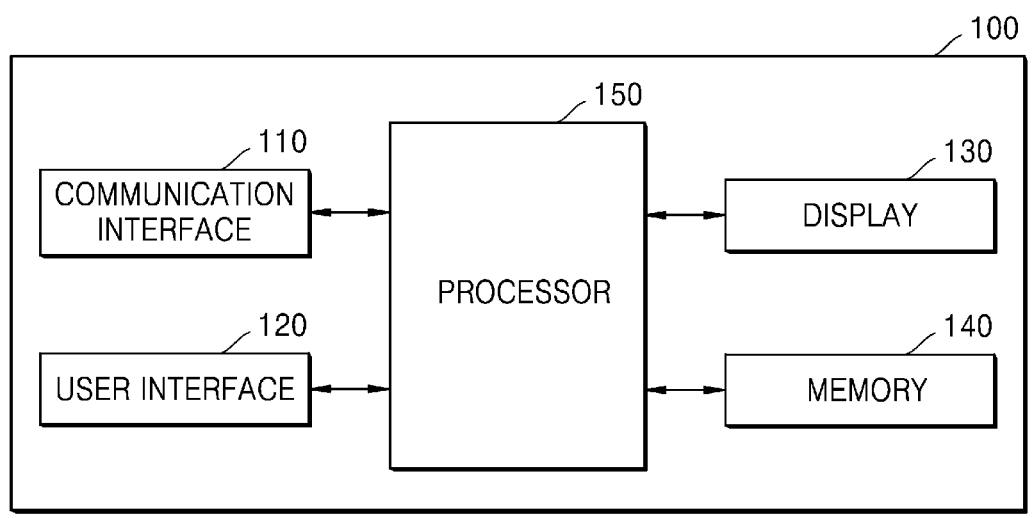
FIG. 4 is a block diagram illustrating a data processing apparatus 100 according to the disclosed embodiment.

FIG. 4 is a block diagram illustrating a data processing apparatus 100 according to the disclosed embodiment.

Referring to FIG. 4, the data processing apparatus 100 may include a communication interface 110, a user interface 120, a display 130, a memory 140, and a processor 150.

The communication interface 110 may communicate with at least one external electronic device through a wired or wireless communication network. In particular, the communication interface 110 may communicate with the scan apparatus 300 under the control of the processor 150. The communication interface 110 may communicate with an external electronic device or server connected through a wired/wireless communication network under the control of the processor.

The communication interface 110 may communicate with an external electronic device (e.g., an intraoral scanner, a server, or an external medical device) through a wired or wireless communication network. In particular, the communication interface may include at least one short-distance communication module for performing communication according to communication standards such as Bluetooth, Wi-Fi, Bluetooth Low Energy (BLE), NFC/RFID, Wifi Direct, UWB, or ZIGBEE.

In addition, the communication interface 110 may further include a long-distance communication module that communicates with a server for supporting long-distance communication according to the long-distance communication standard. In particular, the communication interface 110 may include a long-distance communication module for performing communication through a network for Internet communication. In addition, the communication interface may include a long-distance communication module for performing communication through a communication network conforming to a communication standard such as 3G, 4G, and/or 5G.

In addition, the communication interface 110 may include at least one port for connecting to an external electronic device by a wired cable to communicate with an external electronic device (e.g., intraoral scanner, etc.) by wire. Accordingly, the communication interface 110 may communicate with an external electronic device connected by wire through at least one port.

The user interface 120 may receive a user input for controlling the data processing apparatus. The user interface 120 may include a user input device including a touch panel for sensing a user's touch, a button for receiving a user's push operation, a mouse or keyboard for designating or selecting a point on the user interface screen, and the like, but is not limited thereto.

Also, the user interface 120 may include a voice recognition device for voice recognition. For example, the voice recognition device may be a microphone, and the voice recognition device may receive a user's voice command or voice request. Accordingly, the processor may control an operation corresponding to a voice command or a voice request to be performed.

The display 130 displays a screen. In particular, the display 130 may display a preset screen under the control of the processor 150. In particular, the display 130 may display a user interface screen including an intraoral image generated based on data obtained by scanning the intraoral cavity of a patient in the scan apparatus 300. Alternatively, the display 130 may display a user interface screen including information related to a patient's dental treatment.

The memory 140 may store at least one instruction. Also, the memory 140 may store at least one instruction to be executed by the processor. Also, the memory may store at least one program executed by the processor 150. In addition, the memory 140 may store data received from the intraoral scanner (e.g., raw data obtained through intraoral scan, etc.). Alternatively, the memory may store an intraoral image representing the intraoral cavity in three dimensions.

The processor 150 performs at least one instruction stored in the memory 140 to control an intended operation to be performed. Here, at least one instruction may be stored in an internal memory included in the processor 150 or a memory 140 included in the data processing apparatus separately from the processor.

In particular, the processor 150 may perform at least one instruction to control at least one configuration included in the data processing apparatus so that an intended operation is performed. Therefore, even if the processor performs certain operations as an example, the processor may control at least one component included in the data processing apparatus so that preset operations are performed.

According to an embodiment, the processor 150 may display the eggshell generated based on the surface data of the tooth selected in the intraoral image by executing one or more instructions stored in the memory 140. In addition, the processor 150 may provide a user interface for adjusting the boundary of the eggshell by executing one or more instructions stored in the memory 140. In addition, the processor 150 may display the modified eggshell by executing one or more instructions stored in the memory 140 and adjusting the boundary of the eggshell according to a user input through the user interface.

According to an embodiment, the user interface may include an item that enables receiving a user input for selecting a size of a boundary of the eggshell.

According to an embodiment, the processor 150 executes one or more instructions stored in the memory 140, such that the size of the boundary of the eggshell may be determined based on a size selected according to a user input received through the user interface, and the eggshell may be transformed to have the determined boundary size.

By executing one or more instructions stored in memory 140 according to one embodiment, the processor 150 may identify a region from the boundary of the eggshell to a preset distance in the occlusion direction as a variable region, identify a region excluding the variable region from the eggshell as a fixed region, and connect the fixed region and the variable region modified according to the change in the size of the boundary of the eggshell.

By executing one or more instructions stored in memory 140 according to one embodiment, the processor 150 may prepare a basic eggshell having a boundary of a basic size based on the surface data of the selected tooth, a largest eggshell having a boundary of a largest size extended by a first size than the boundary of the basic size, and a smallest eggshell having a boundary of a smallest size reduced by a second size compared to the boundary of the basic size, and transform the eggshell using the basic eggshell, the largest eggshell, and the smallest eggshell. The boundary of the eggshell may vary between the boundary of the largest size and the boundary of the smallest size.

According to an embodiment, the user interface may include an item that transforms the eggshell into the largest eggshell according to a user input moving in the first direction and transforms the eggshell into the smallest eggshell according to a user input for moving in the second direction based on the basic eggshell.

According to an example, the processor 150 may be implemented in a form that internally includes at least one internal processor and a memory device (e.g., RAM, ROM, etc.) for storing at least one of programs, instructions, signals, and data to be processed or used by the internal processor.

In addition, the processor 150 may include a graphic processing unit for processing a graphic corresponding to a video. In addition, the processor 150 may be implemented as a system on chip (SoC) in which a core and a GPU are integrated. Also, the processor 150 may include a single core or multiple cores. For example, the processor may include a dual-core, triple-core, quad-core, hexa-core, octa-core, deca-core, dodeca-core, hexa-dash-vale core, and the like.

In the disclosed embodiment, the processor 150 may generate an intraoral image based on a two-dimensional image received from the scan apparatus 300.

In particular, under the control of the processor 150, the communication interface 110 may receive data obtained from the scan apparatus 300, for example, raw data obtained through an intraoral scan. In addition, the processor 150 may generate a three-dimensional intraoral image representing the intraoral cavity three-dimensionally based on the raw data received from the communication interface. For example, to reconstruct a three-dimensional image according to the optical triangulation method, and the intraoral scanner may include at least one camera and, in a specific embodiment, may include an L camera corresponding to a left field of view and an R camera corresponding to a right field of view. In addition, the intraoral scanner may acquire L image data corresponding to the left field of view and R image data corresponding to the right field of view from the L camera and the R camera, respectively. Subsequently, the intraoral scanner (not shown) may transmit raw data including L image data and R image data to the communication interface of the data processing apparatus 100.

Then, the communication interface 110 may transmit the received raw data to the processor, and the processor may generate an intraoral image representing the intraoral cavity in three dimensions based on the received raw data.

In addition, the processor 150 may directly receive an intraoral image representing the intraoral cavity from an external server, a medical device, or the like by controlling the communication interface. In this case, the processor may acquire a three-dimensional intraoral image without generating a three-dimensional intraoral image based on the raw data.

According to the disclosed embodiment, that the processor 150 performs operations such as 'extract', 'acquire', and 'generate' may include controlling other components to perform the above-described operations in addition to directly performing the above-described operations by executing at least one instruction in the processor 150.

To implement the embodiments disclosed in the present disclosure, the data processing apparatus 100 may include only some of the components illustrated in FIG. 4, or may include more components in addition to the components illustrated in FIG. 4.

In addition, the data processing apparatus 100 may store and execute dedicated software linked to the intraoral scanner. Here, the dedicated software may be called a dedicated program, a dedicated tool, or a dedicated application. When the data processing apparatus 100 operates in conjunction with the scan apparatus 300, dedicated software stored in the data processing apparatus 100 may be connected to the scan apparatus 300 to receive data acquired through an intraoral scan in real time. For example, there is dedicated software for processing data acquired through intraoral scans in Medit's i500 intraoral scanner. In particular, Medit produces and distributes software for processing, managing, using, and/or transmitting data acquired from intraoral scanners. Here, "dedicated software" refers to a program, tool, or application that may be operated in conjunction with the intraoral scanner, such that "dedicated software" may be commonly used by various intraoral scanners developed and sold by various manufacturers. In addition, the dedicated software described above may be produced and distributed separately from the intraoral scanner that performs the intraoral scan.

The data processing apparatus 100 may store and execute dedicated software corresponding to an intraoral scanner product. The dedicated software may perform at least one operation to acquire, process, store, and/or transmit the intraoral image. Here, the dedicated software may be stored in the processor. In addition, dedicated software may provide a user interface for use of data acquired from the intraoral scanner. Here, the user interface screen provided by the dedicated software may include an intraoral image generated according to the disclosed embodiment.

Figure 5:
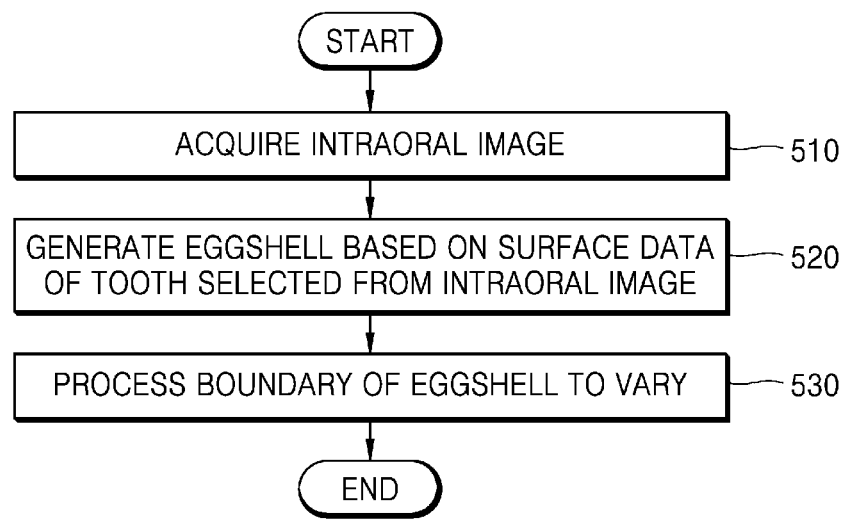
FIG. 5 is a flowchart illustrating a method of processing an intraoral image in a data processing apparatus according to an embodiment.

FIG. 5 is a flowchart illustrating a method of processing an intraoral image in a data processing apparatus according to an embodiment. The three-dimensional intraoral model processing method illustrated in FIG. 5 may be performed through the data processing apparatus 100. Accordingly, the three-dimensional intraoral model processing method illustrated in FIG. 5 may be a flowchart illustrating operations of the data processing apparatus 100.

Referring to FIG. 5, in operation 510, the data processing apparatus 100 may acquire an intraoral image.

The data processing apparatus 100 may receive, from the scan apparatus 300, raw data obtained by scanning an intraoral in a patient or by scanning a dental model, and acquire an intraoral image including a tooth region and a gingiva region by processing the received raw data. Alternatively, the data processing apparatus 100 may acquire an intraoral image stored in a memory.

Figure 6:
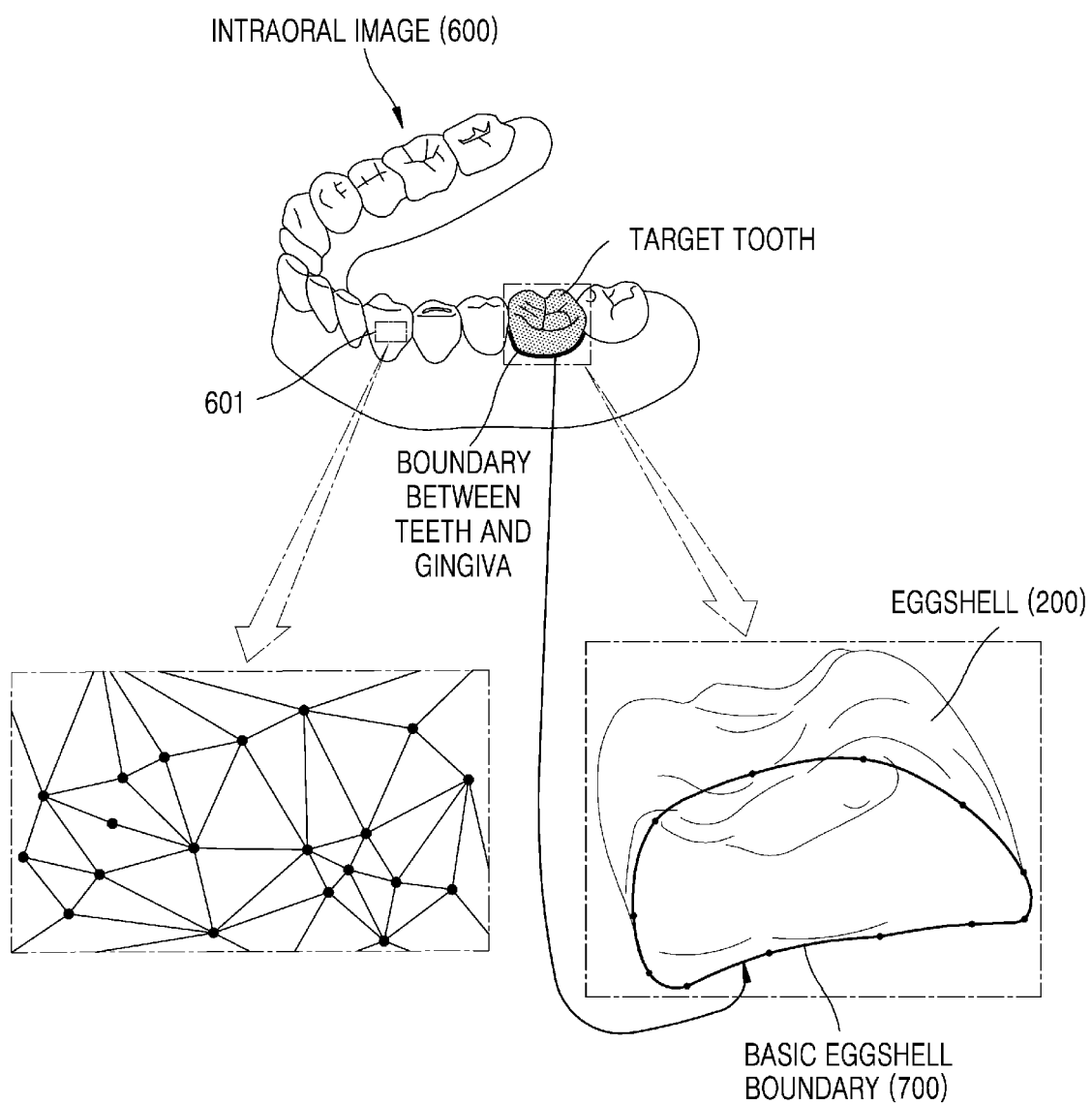
FIG. 6 shows an example of an intraoral image acquired by the data processing apparatus 100 according to an example.

FIG. 6 illustrates an example of an intraoral image obtained by the data processing apparatus 100 according to an example.

For example, when two-dimensional data is obtained using an intraoral scanner, the data processing apparatus 100 may calculate coordinates of a plurality of illuminated surface points using a triangulation method. As the amount of scan data increases by scanning the surface of the object while moving using the intraoral scanner, coordinates of the surface points may be accumulated. As a result of this image acquisition, a point cloud of vertices may be identified to represent the extent of the surface. Points in the point cloud may represent actual measured points on the three-dimensional surface of the object. The surface structure may be approximated by forming a polygonal mesh in which adjacent vertices of a point cloud are connected by line segments. The polygonal mesh may be variously determined, such as a triangular, quadrangular, or pentagonal mesh. The relationship between the polygons of the mesh model and the neighboring polygons may be used to extract features of the tooth boundary, for example, curvature, smallest curvature, edge, spatial relationship, and the like.

Referring to FIG. 6, a partial region 601 of an intraoral image 600 may be configured as a triangular mesh generated by connecting a plurality of vertices constituting a point cloud and adjacent vertices with a line.

Returning to FIG. 5, in operation 520, the data processing apparatus 100 may generate an eggshell based on surface data of a tooth selected from the intraoral image.

The data processing apparatus 100 may select a target tooth for generating an eggshell from the intraoral image. The data processing apparatus 100 may select a target tooth according to a user input for selecting the target tooth or may select a target tooth according to a selection process inside the apparatus.

The data processing apparatus 100 may generate an eggshell by using surface data of the selected target tooth. In addition, the data processing apparatus 100 may set the boundary between the selected target tooth and the gingiva as an eggshell boundary. As described above, an eggshell boundary generated based on the boundary between the target tooth and gingiva may be referred to as a basic eggshell boundary, and an eggshell having a basic eggshell boundary may be referred to as a basic eggshell.

In operation 530, the data processing apparatus 100 may process the boundary of the eggshell to vary.

According to an embodiment, the data processing apparatus 100 may transform the eggshell by processing the boundary of the eggshell to vary.

Figure 7:
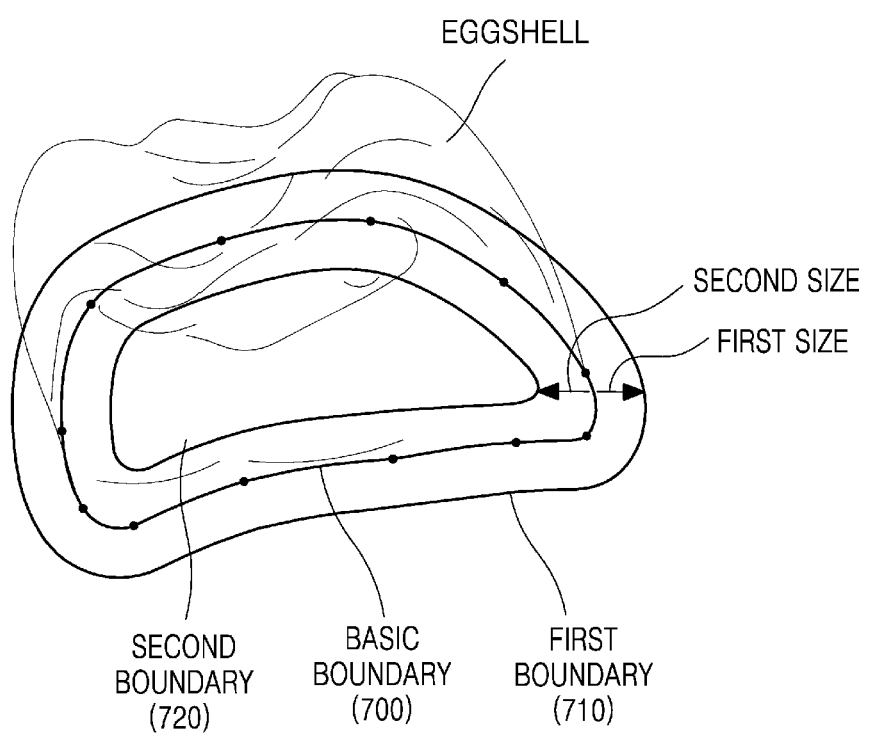
FIG. 7 shows examples of a basic eggshell boundary, a first eggshell boundary, and a second eggshell boundary according to an embodiment.

FIG. 7 illustrates examples of a basic eggshell boundary, a first eggshell boundary, and a second eggshell boundary according to an embodiment.

Referring to FIG. 7, according to an embodiment, the data processing apparatus 100 may generate a first eggshell boundary 710 and a second eggshell boundary 720 based on the basic eggshell boundary 700 generated based on the boundary of the target tooth and gingival. The first eggshell boundary 710 may represent a largest eggshell boundary indicating the largest size to which the basic eggshell boundary may be expanded and the second eggshell boundary 720 may represent a smallest eggshell boundary indicating a smallest size to which the basic eggshell boundary may be reduced. The first eggshell boundary 710 may represent a shape extended by a first size from the basic eggshell boundary 700. The second eggshell boundary 720 may represent a reduced form by a second size from the basic eggshell boundary. The first size and the second size may be the same or different.

According to one embodiment, the data processing apparatus 100 may prepare the first eggshell boundary 710 and the second eggshell boundary 720 based on the basic eggshell boundary 700 in this way, and may process the eggshell boundary to be variable by adjusting the eggshell boundary between the first eggshell boundary 710 and the second eggshell boundary 720.

According to one embodiment, the data processing apparatus 100 may process the eggshell boundary to vary between the first eggshell boundary and the second eggshell boundary according to a user input for adjusting the eggshell boundary from the user.

According to an embodiment, the data processing apparatus 100 may transform at least a part of the eggshell as the size of the eggshell boundary is changed.

Figure 8:
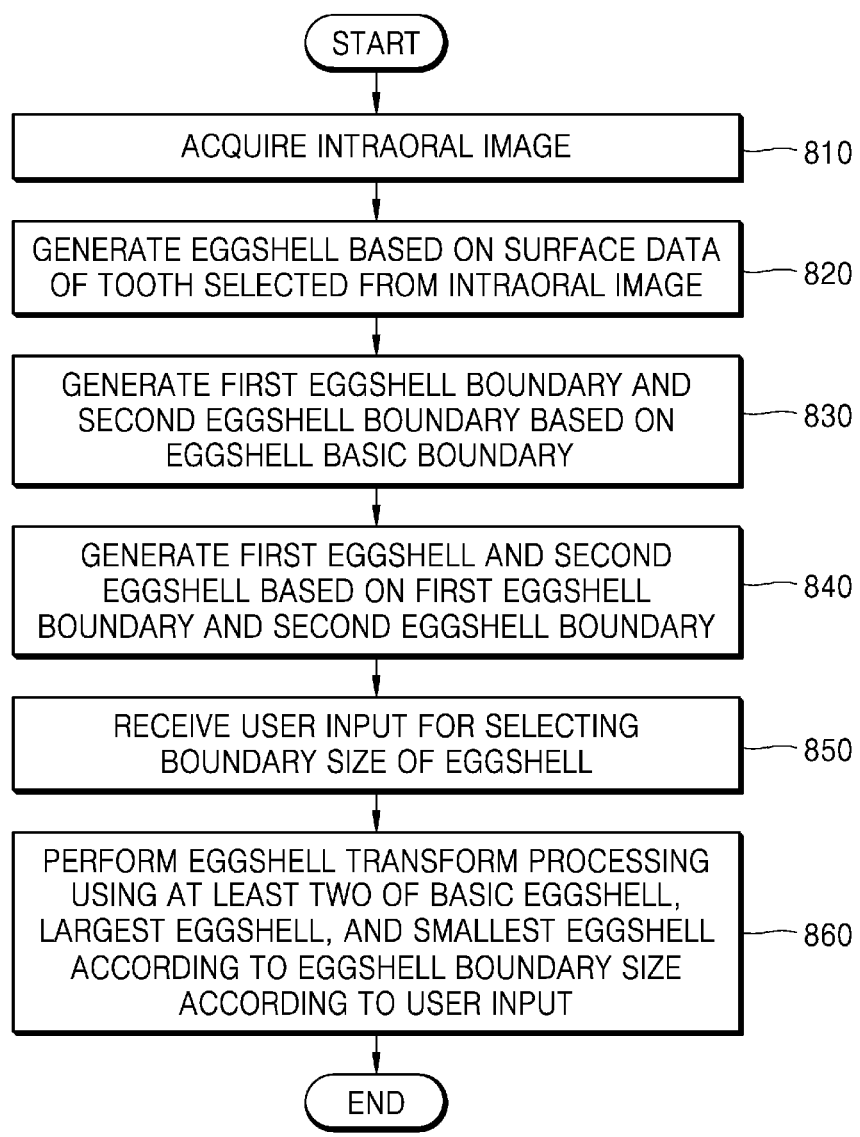
FIG. 8 is a flowchart illustrating a method of processing a three-dimensional intraoral model in a data processing apparatus according to an embodiment.

FIG. 8 is a flowchart illustrating a method of processing a three-dimensional intraoral model in a data processing apparatus according to an embodiment. The three-dimensional intraoral model processing method illustrated in FIG. 8 may be performed through the data processing apparatus 100. Accordingly, the three-dimensional intraoral model processing method illustrated in FIG. 8 may be a flowchart illustrating operations of the data processing apparatus 100.

Referring to FIG. 8, in operation 810, the data processing apparatus 100 may acquire an intraoral image. Since operation 810 is the same as operation 510 of FIG. 5, further description is omitted.

In operation 820, the data processing apparatus 100 may generate an eggshell based on surface data of a tooth selected from the intraoral image. The data processing apparatus 100 may select a target tooth for generating an eggshell from the intraoral image. The data processing apparatus 100 may select a target tooth according to a user input for selecting the target tooth or may select a target tooth according to a selection process inside the apparatus.

The data processing apparatus 100 may generate an eggshell by using surface data of the selected target tooth. In addition, the data processing apparatus 100 may set the boundary between the selected target tooth and the gingiva as an eggshell boundary. As described above, an eggshell boundary generated based on the boundary between the target tooth and gingiva may be referred to as a basic eggshell boundary, and an eggshell having a basic eggshell boundary may be referred to as a basic eggshell. Since operation 820 is the same as operation 520 of FIG. 5, further description is omitted.

In operation 830, the data processing apparatus 100 may generate a first eggshell boundary and a second eggshell boundary based on the basic eggshell boundary. The first eggshell boundary may represent a largest eggshell boundary in which the boundary of the basic eggshell is the largest, and the second eggshell boundary may represent a smallest eggshell boundary in which the boundary of the basic eggshell is the smallest shrunk.

An example of a method of generating the first eggshell boundary and the second eggshell boundary will be described with reference to FIG. 9.

Figure 9:
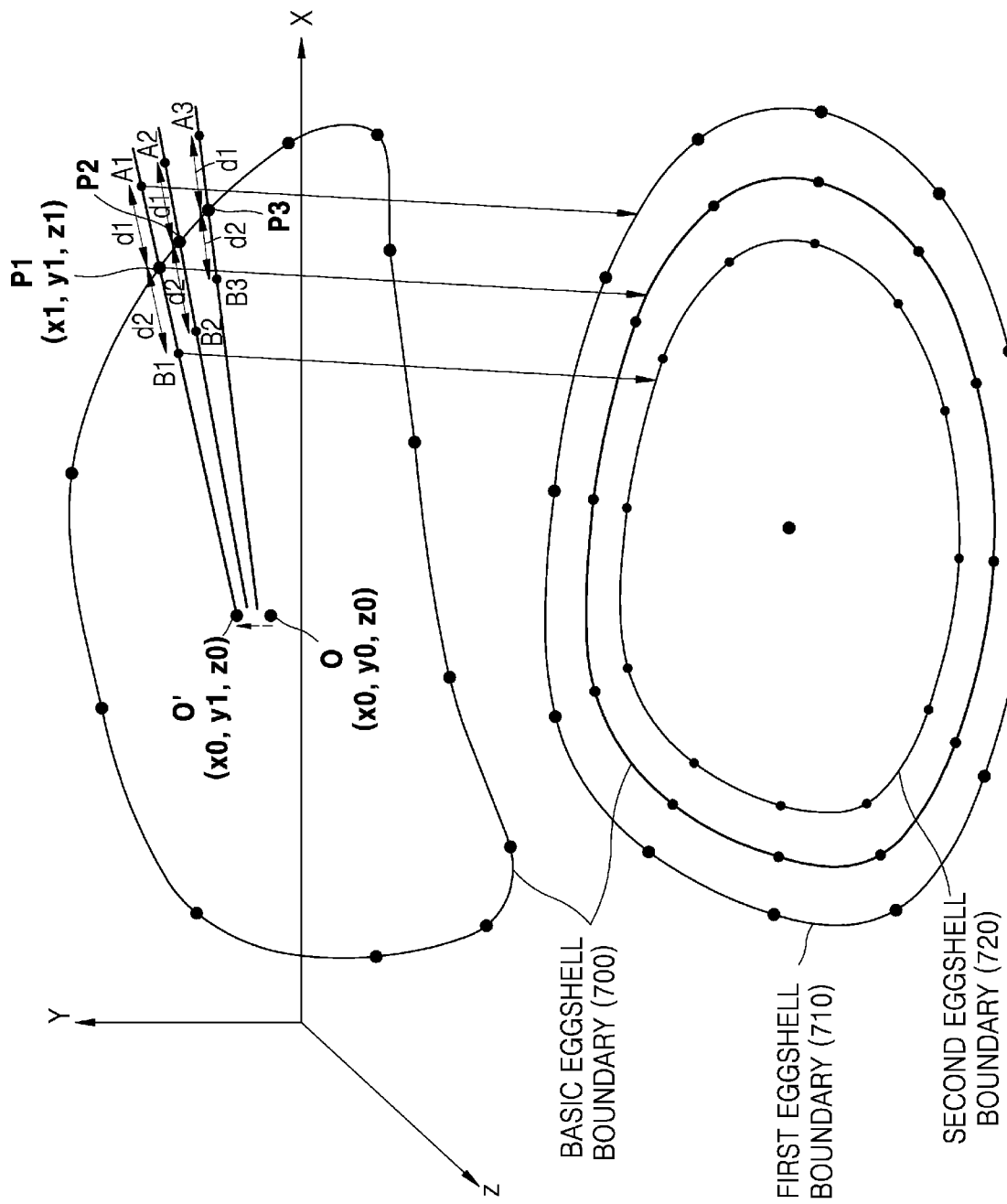
FIG. 9 is a reference diagram for explaining an example of a method of generating a first eggshell boundary and a second eggshell boundary according to an embodiment.

FIG. 9 is a reference diagram for explaining an example of a method of generating a first eggshell boundary and a second eggshell boundary according to an embodiment.

Referring to FIG. 9, first, the data processing apparatus 100 finds the loop center point (x0, y0, z0) of the basic eggshell boundary 700. There may be several ways to find the loop center point, and typically, the center point of the bounding box surrounding the basic eggshell boundary 700 may be found, or the center point may be found as the average of all point coordinate values constituting the basic eggshell boundary 700.

Next, the data processing apparatus 100 may find the moved loop center point O'(x0,y1,z0) by matching the y value of the first point P1(x1, y1, z1), which is one of the points constituting the boundary by moving the loop center point O(x0,y0,z0) in the occlusion direction (e.g., y-axis). Then, the line connecting the moved loop center point O'(x0, y1, z0) and the first point P1(x1, y1, z1) may be shrunk or expanded by a preset length. The line connecting the moved loop center point O'(x0,y1,z0) and the first point P1(x1,y1, z1) may be extended by a preset distance d1 to obtain a point A1, and may be shrunk by a preset distance d2 to obtain a point B1. d1 and d2 may be the same length or different distances. A2 and B2 may be obtained by performing this process for the second point P2, which is another point constituting the basic eggshell boundary 700, and A3 and B3 may be obtained by performing this process also for the third point P3. In this way, the data processing apparatus 100 may acquire points A1, A2, and An and points B1, B2, and Bn by performing all of the points P1, P2, and Pn constituting the basic eggshell boundary 700. Then, the data processing apparatus 100 may acquire the first eggshell boundary 710 by connecting the points A1, A2, and An on the outside of the basic eggshell boundary 700, and may acquire the second eggshell boundary 720 by connecting the points B1, B2, and Bn inside the basic eggshell boundary 700. The first eggshell boundary 710 may be the largest boundary loop, and the second eggshell boundary 720 may be the smallest boundary loop. In this way, the loop of the boundary, which is transformed by expanding/reducing the y value of the loop center point to match the y value of each point constituting the boundary, is not transformed in the occlusion direction, but expands and shrinks based on the plane whose occlusion direction is normal. In other words, when expanding the boundary of the basic eggshell to generate the largest boundary and collapsing it to generate the smallest boundary, by making the points constituting the largest boundary or smallest boundary move on a plane perpendicular to the occlusion direction rather than moving in the occlusion direction, compared to the points of the basic boundary, such that a smoother expansion/reduction boundary may be obtained.

In operation 840, the data processing apparatus 100 may generate a first eggshell and a second eggshell based on the first eggshell boundary and the second eggshell boundary. The first eggshell may represent the largest eggshell having the first eggshell boundary in which the boundary of the basic eggshell is most greatly expanded. The second eggshell may represent a smallest eggshell having a second eggshell boundary in which the boundary of the basic eggshell is the smallest.

Figure 10:
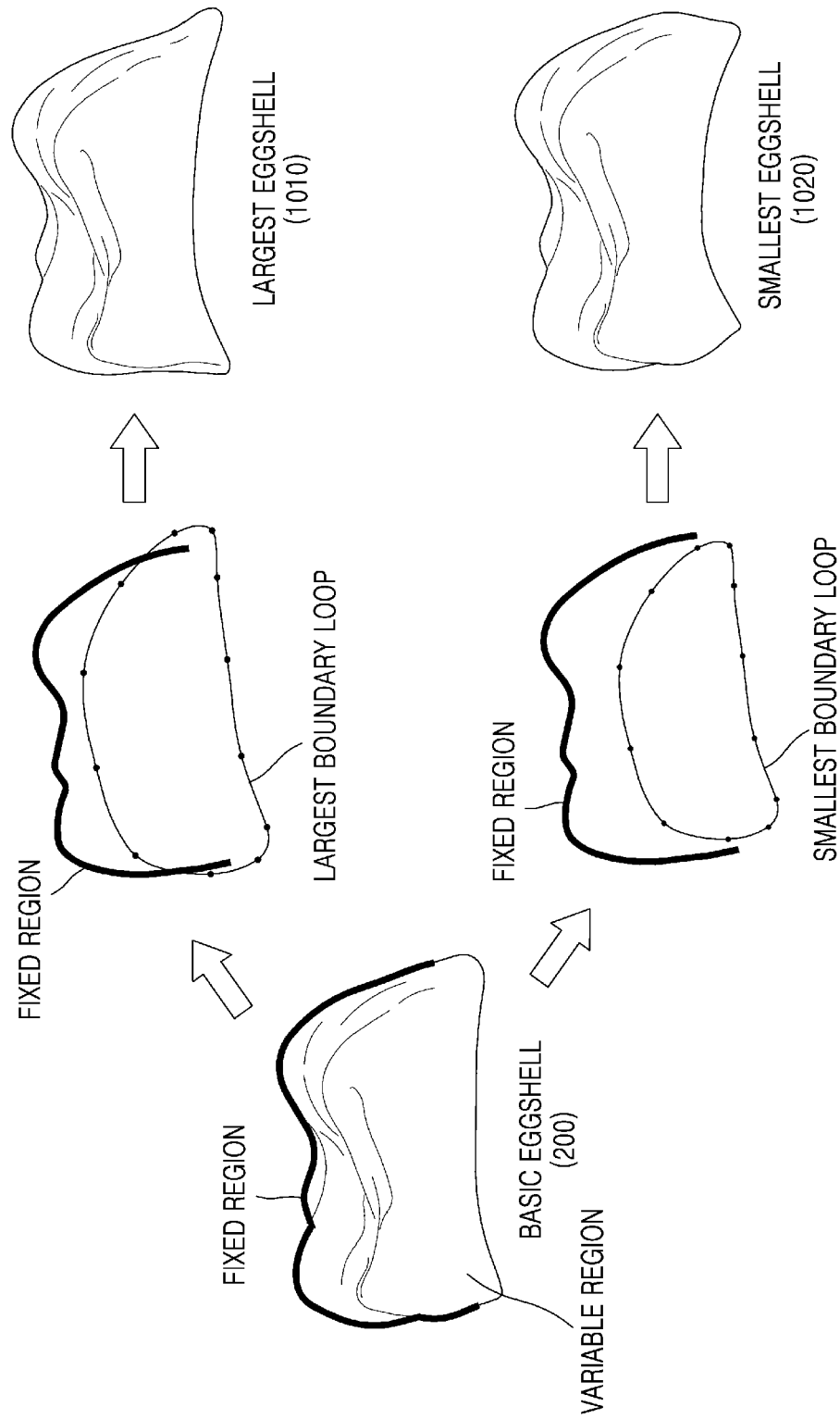
FIG. 10 is a reference diagram for explaining a method of generating a largest eggshell and a smallest eggshell based on a basic eggshell according to an embodiment.

FIG. 10 is a reference diagram for explaining a method of generating a largest eggshell and a smallest eggshell based on a basic eggshell according to an embodiment.

Referring to FIG. 10, the data processing apparatus 100 may identify a fixed region that is not transformed even by the transform of the eggshell and a variable region that is a region that is transformed by the transform of the eggshell in the basic eggshell generated based on the target tooth selected from the intraoral image. The variable region may include a region up to a certain distance from the boundary of the basic eggshell, and the fixed region may indicate a portion of the basic eggshell except for the variable region.

In addition, the data processing apparatus 100 may generate a smallest eggshell and a largest eggshell corresponding to each of the smallest boundary loop and the largest boundary loop obtained in FIG. 9. That is, the data processing apparatus 100 may transform the variable region of the basic eggshell based on the smallest boundary loop to generate the smallest eggshell, and transform the variable region of the basic eggshell based on the largest boundary loop to generate the largest eggshell.

In this way, based on the basic eggshell, the data processing apparatus 100 may store a total of three eggshell meshes, that is, a basic eggshell mesh, a smallest eggshell mesh, and a largest eggshell mesh by generating the largest eggshell with the largest boundary and the smallest eggshell with the smallest boundary.

Figure 11:
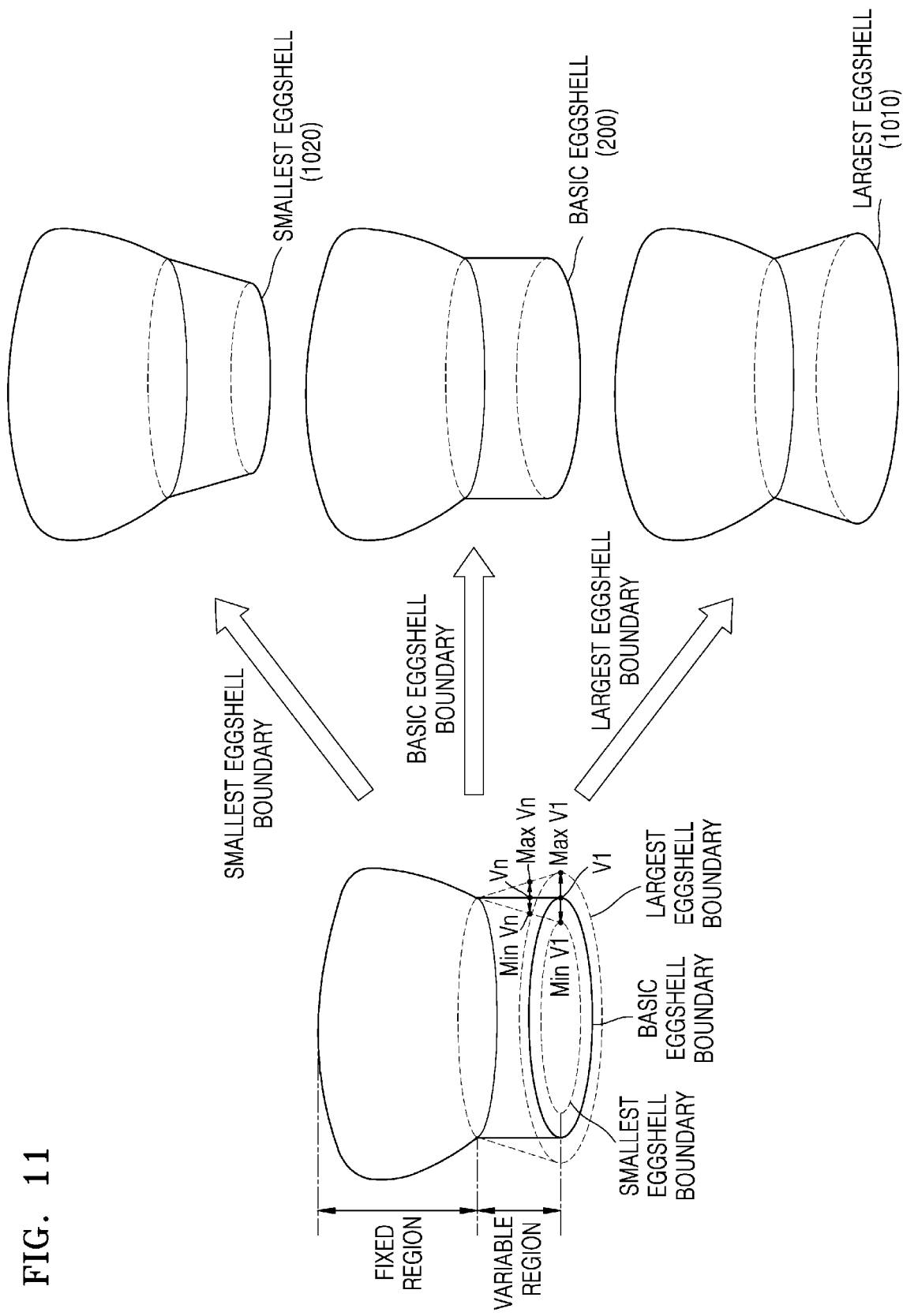
FIG. 11 is a reference diagram for explaining an example of a method of generating a first eggshell and a second eggshell by the data processing apparatus 100 based on the first eggshell boundary and the second eggshell boundary.

FIG. 11 is a reference diagram for explaining an example of a specific method of the data processing apparatus 100 generating a first eggshell and a second eggshell based on the first eggshell boundary and the second eggshell boundary.

Referring to FIG. 11, the data processing apparatus 100 may identify from the basic eggshell a fixed region (not transformable area) that is not transformed even if the eggshell shrinks/expands and a variable region (transformable area) excluding the fixed region. For example, the data processing apparatus 100 may identify a region from a basic boundary of a basic eggshell to a preset distance or a preset mesh point as a variable region, and a region excluding the variable region from an eggshell as a fixed region.

The next data processing apparatus 100 transforms the variable region by processing connecting the fixed region of the basic eggshell and the largest boundary loop to generate the first eggshell, which is the largest eggshell. In this case, the connection part of the variable region and the fixed region may be smoothed. In particular, when each vertex of the basic boundary of the basic eggshell moves to the corresponding vertex of the largest boundary, the data processing apparatus 100 calculates where the vertices of the mesh belonging to the variable region will move and obtains the largest eggshell by finding the vertices of the mesh of the largest eggshell. Referring to FIG. 10, for example, when a vertex V1 of a basic boundary moves to a corresponding vertex Max V1 of a largest boundary, Max Vn may be obtained by finding how other vertices Vn belonging to the variable region of the basic eggshell move, for example, using RBF (Radial Basis Function) interpolation. Using this method, the vertices of the largest eggshell may be obtained by finding the moved vertices for other vertices belonging to the variable region of the basic boundary.

In addition, the data processing apparatus 100 transforms the variable region by processing to connect the fixed region of the basic eggshell and the smallest boundary loop to generate the second eggshell, which is the smallest eggshell. In this case, the connection part of the variable region and the fixed region may be smoothed. In particular, when each vertex of the basic boundary of the basic eggshell moves to the corresponding vertex of the smallest boundary, the data processing apparatus 100 calculates where the vertices of the mesh belonging to the variable region will move and obtains the smallest eggshell by finding the vertices of the mesh of the smallest eggshell. Referring to FIG. 10, for example, when a vertex V1 of a basic boundary moves to a corresponding vertex Min V1 of a smallest boundary, Min Vn may be obtained by finding how other vertices Vn belonging to the variable region of the basic eggshell move, for example, using RBF interpolation. Using this method, the vertices of the largest eggshell may be obtained by finding the moved vertices for other vertices belonging to the variable region of the basic boundary.

In this way, the data processing apparatus 100 may acquire the largest eggshell and the smallest eggshell based on the basic eggshell. When the largest eggshell and the smallest eggshell are obtained in this way, the data processing apparatus 100 may transform the size of the eggshell between the largest eggshell and the smallest eggshell.

Referring back to FIG. 8, in operation 850, the data processing apparatus 100 may receive a user input for selecting a boundary size of the eggshell.

In operation 860, according to the eggshell boundary size selected according to the user input, the data processing apparatus 100 may perform eggshell transform processing by interpolating using at least two of a basic eggshell, a largest eggshell, and a smallest eggshell.

According to an embodiment, the data processing apparatus 100 may provide a user interface for selecting a boundary size of an eggshell, and may receive a user input for selecting a boundary size of the eggshell through the user interface. The user interface for selecting the boundary size of the eggshell may be implemented in various ways.

Figure 12:
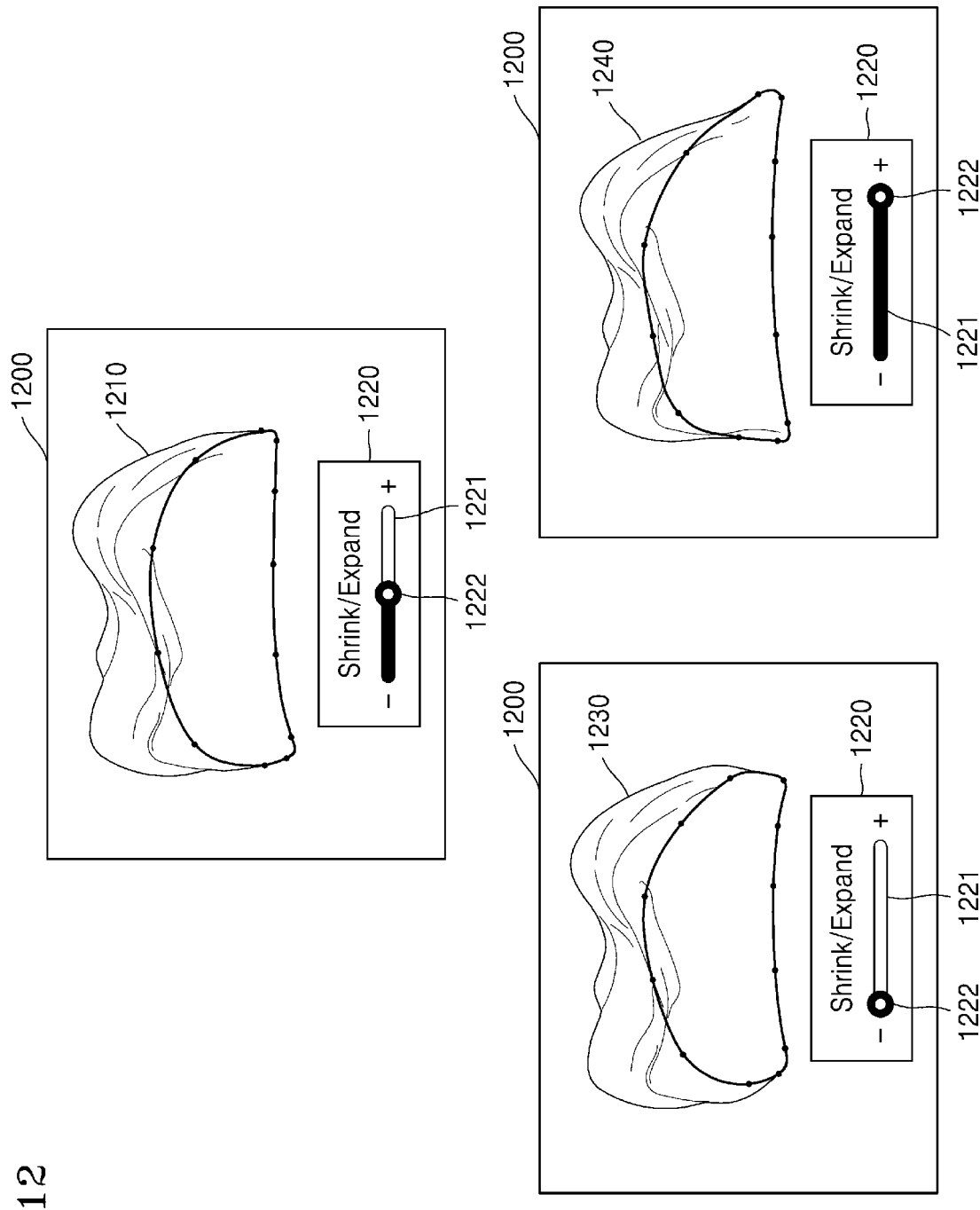
FIG. 12 shows an example of a user interface for selecting a boundary size of an eggshell according to an embodiment.

FIG. 12 illustrates an example of a user interface for selecting a boundary size of an eggshell according to an embodiment.

Referring to FIG. 12, the data processing apparatus 100 may output a user interface 1100 for selecting the boundary size of the eggshell on the display.

According to an embodiment, the user interface 1100 may include an eggshell image 1210 of a target tooth selected by a user and a menu 1220 for adjusting a boundary size of the eggshell. The menu 1220 may include a slide bar 1221 and a button 1222 movable on the slide bar 1222. The user may select the boundary size by moving the button 1222 on the slide bar 1221 while the button 1222 is selected through the user input means. The slide bar 1221 may correspond to a variable amount of the eggshell boundary size. For example, the middle of the slide bar 1221 may be the basic eggshell boundary size, the (−) direction end may be the smallest eggshell boundary size, and the (+) direction end may be the largest eggshell boundary size. For example, when the button 1222 is positioned at the (+) direction end of the slide bar 1221 by a user input, the data processing apparatus 100 may display the first eggshell image 1240 having the largest eggshell boundary size on the display. For example, when the button 1222 is positioned at the (−) direction end of the slide bar 1221 by a user input, the data processing apparatus 100 may display the second eggshell image 1230 having the smallest eggshell boundary size on the display. For example, when the button 1222 is positioned at the middle of between the center of the slide bar 1221 and the (+) direction end by the user input, the data processing apparatus 100 may display the eggshell on the display so that the size of the eggshell boundary has an intermediate value between the size of the basic eggshell boundary and the size of the largest eggshell boundary. Such an eggshell may be obtained by interpolating using at least two of a basic eggshell, a largest eggshell, and a smallest eggshell. For example, an eggshell may be interpolated using the largest eggshell and smallest eggshell, or interpolated using the largest eggshell and basic eggshell, or interpolated using the smallest eggshell and basic eggshell.

The intraoral image processing method according to an embodiment of the present disclosure may be implemented in the form of program instructions that may be executed through various computer means and recorded in a computer-readable medium. Also, an embodiment of the present disclosure may be a computer-readable storage medium in which one or more programs including at least one instruction for executing an intraoral image processing method are recorded.

The computer-readable storage medium may include program instructions, data files, data structures, etc. alone or in combination. Here, examples of computer-readable storage media may include hardware devices configured to store and execute program instructions, for example, magnetic media such as hard disks, floppy disks and magnetic tapes, optical media such as CD-ROM and DVD, magneto-optical media such as a floptical disk, and ROM, RAM, flash memory, etc.

Here, the device-readable storage medium may be provided in the form of a non-transitory storage medium. Here, the 'non-transitory storage medium' may mean that the storage medium is a tangible device. Also, the 'non-transitory storage medium' may include a buffer in which data is temporarily stored.

According to one embodiment, the intraoral image processing method according to various embodiments disclosed herein may be included in a computer program product and provided. The computer program product may be distributed in the form of a machine-readable storage medium (e.g., compact disc read only memory (CD-ROM)). Alternatively, the computer program produce may be distributed online (e.g., downloaded or uploaded) through an application store (e.g., play store, etc.) or directly between two user devices (e.g., smartphones). In particular, the computer program product according to the disclosed embodiment may include a storage medium in which a program including at least one instruction to perform the intraoral image processing method according to the disclosed embodiment is recorded.

According to the method and apparatus for processing an intraoral image according to the disclosed embodiment, when designing an eggshell, which is a temporary crown, it is possible to provide an interface that may adjust the size of the eggshell boundary while preventing distortion of the shape of the boundary of the eggshell.

According to the method and apparatus for processing an intraoral image according to the disclosed embodiment, user convenience may be increased by providing a user interface that may easily adjust the boundary of the eggshell.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An intraoral image processing method comprising:
   obtaining a three-dimensional intraoral image which is generated by scanning an intraoral cavity or a tooth model using a scanner;
   generating a basic eggshell generated based on three-dimensional data corresponding to a target tooth selected from the three-dimensional intraoral image, the basic eggshell having a basic eggshell boundary which is a boundary between the target tooth and a gingiva;
   providing a user interface including an image of the basic eggshell and an item which enables receiving a user input for selecting a size which is variable between a first eggshell boundary expanded by a first size than a size of the basic eggshell boundary, and a second eggshell boundary reduced by a second size from the size of the basic eggshell boundary, wherein the item comprises a slide bar and a button which is movable along the slide bar, and one end of the slide bar corresponds to the first eggshell boundary and the other end of the slide bar corresponds to the second eggshell boundary;
   determining the size of an eggshell boundary of a target eggshell based on the size corresponding to a position of the button which is located according to the user input to move the button within the slide bar;
   obtaining the target eggshell by transforming the basic eggshell to the target eggshell such that the eggshell boundary has the size selected according to the user input; and
   changing the image of the basic eggshell to an image of the target eggshell and displaying the image of the target eggshell in the user interface.

2. The method of claim 1, wherein the transforming of the basic eggshell comprises:
   identifying a region from the basic eggshell boundary of the basic eggshell to a preset distance in an occlusion direction as a variable region, and identifying a region excluding the variable region from the basic eggshell as a fixed region; and
   connecting the fixed region and the variable region transformed according to a change in the size of the basic eggshell boundary of the basic eggshell.

3. The method of claim 1, wherein the item enables transforming the basic eggshell into the first eggshell according to a user input moving in a first direction, and enables transforming the basic eggshell into the second eggshell according to a user input moving in a second direction.

4. The method of claim 1, further comprising:
   obtaining the target eggshell by transforming the basic eggshell to the target eggshell by performing a interpolation using at least two of the first eggshell, the second eggshell, and the basic eggshell such that the eggshell boundary has the size corresponding to the position of the button.

5. A data processing apparatus for processing an intraoral image, the apparatus comprising:
   a memory including one or more instructions; and
   a processor configured to execute the one or more instructions stored in the memory,
   wherein the processor, by executing the one or more instructions, is configured to:
   obtain a three-dimensional intraoral image which is generated by scanning an intraoral cavity or a tooth model using a scanner;
   generate a basic eggshell based on three-dimensional data corresponding to a target tooth selected from a three-dimensional intraoral image, the basic eggshell having a basic eggshell boundary which is a boundary between the target tooth and a gingiva;
   provide a user interface including an image of the basic eggshell and an item which enables receiving a user input for selecting a size which is variable between a first eggshell boundary expanded by a first size than a size of the basic eggshell boundary, and a second eggshell boundary reduced by a second size than the size of the basic eggshell boundary;
   determine the size of an eggshell boundary of a target eggshell based on the size selected according to the user input received through the user interface, wherein the item comprises a slide bar and a button which is movable along the slide bar, and one end of the slide bar corresponds to the first eggshell boundary and the other end of the slide bar corresponds to the second eggshell boundary;
   obtain the target eggshell by transforming the basic eggshell to the target eggshell such that the eggshell boundary has the size corresponding to a position of the button which is located according to the user input to move the button within the slide bar; and
   change the image of the basic eggshell to an image of the target eggshell and display the image of the target eggshell in the user interface.

6. The data processing apparatus of claim 5, wherein the processor, by executing the one or more instructions, is further configured to:
   identify a region from the basic eggshell boundary of the basic eggshell to a preset distance in an occlusion direction as a variable region, and identify a region excluding the variable region from the basic eggshell as a fixed region; and
   connect the fixed region and the variable region transformed according to a change in the size of the basic eggshell boundary of the basic eggshell.

7. The data processing apparatus of claim 5, wherein the item enables transforming the basic eggshell into the first eggshell according to a user input moving in a first direction, and enables transforming the basic eggshell into the second eggshell according to a user input moving in a second direction.

8. The data processing apparatus of claim 5, wherein the processor, by executing the one or more instructions, is further configured to:
   obtain the target eggshell by transforming the basic eggshell to the target eggshell by performing a interpolation using at least two of the first eggshell, the second eggshell, and the basic eggshell such that the eggshell boundary has the size corresponding to the position of the button.

9. A non-transitory computer-readable recording medium on which a program implemented to perform an intraoral image processing method by a computer is recorded, the intraoral image processing method comprising;

obtaining a three-dimensional intraoral image which is generated by scanning an intraoral cavity or a tooth model using a scanner;

generating a basic eggshell based on three-dimensional data corresponding to a target tooth selected from the three-dimensional intraoral image, the basic eggshell having a basic eggshell boundary which is a boundary between the target tooth and a gingiva;

providing a user interface including an image of the basic eggshell and an item which enables receiving a user input for selecting a size which is variable between a first eggshell boundary expanded by a first size than a size of a basic eggshell boundary, and a second eggshell boundary reduced by a second size than the size of the basic eggshell boundary, wherein the item comprises a slide bar and a button which is movable along the slide bar, and one end of the slide bar corresponds to the first eggshell boundary and the other end of the slide bar corresponds to the second eggshell boundary;

determining the size of an eggshell boundary of a target eggshell based on the size corresponding to a position of the button which is located according to the user input to move the button within the slide bar;

obtaining the target eggshell by transforming the basic eggshell to the target eggshell such that the eggshell boundary has the size selected according to the user input; and changing the image of the basic eggshell to an image of the target eggshell and displaying the image of the target eggshell in the user interface.

10. The non-transitory computer-readable recording medium of claim 9, the intraoral image processing method further comprising:

obtaining the target eggshell by transforming the basic eggshell to the target eggshell by performing a interpolation using at least two of the first eggshell, the second eggshell, and the basic eggshell such that the eggshell boundary has the size corresponding to the position of the button.

\* \* \* \* \*